United States Patent
Fein

(10) Patent No.: US 8,717,175 B2
(45) Date of Patent: May 6, 2014

(54) RFID TAG WITH REDUCED DETUNING CHARACTERISTICS

(75) Inventor: Michael Fein, Grayslake, IL (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 13/179,354

(22) Filed: Jul. 8, 2011

(65) Prior Publication Data

US 2011/0266352 A1 Nov. 3, 2011

Related U.S. Application Data

(63) Continuation of application No. 12/053,109, filed on Mar. 21, 2008, now Pat. No. 7,999,683.

(60) Provisional application No. 60/896,780, filed on Mar. 23, 2007.

(51) Int. Cl.
G08B 13/14 (2006.01)

(52) U.S. Cl.
USPC ......... 340/572.7; 235/488; 235/492; 343/820

(58) Field of Classification Search
CPC ....... H01Q 9/285; H01Q 9/26; H01Q 9/0421; H01Q 1/2225; G06K 19/07749
USPC .......................... 340/572.1–572.9, 10.1–10.5; 343/820–822; 235/488, 492
See application file for complete search history.

(56) References Cited

U.S. PATENT DOCUMENTS

| | | | |
|---|---|---|---|
| 6,888,502 B2 | 5/2005 | Beigel et al. | |
| 6,940,408 B2 | 9/2005 | Ferguson et al. | |
| D546,820 S * | 7/2007 | Oliver | D14/230 |
| 2001/0007335 A1* | 7/2001 | Tuttle et al. | 235/492 |
| 2002/0070862 A1 | 6/2002 | Francis et al. | |
| 2005/0104790 A1 | 5/2005 | Duron | |
| 2006/0080819 A1 | 4/2006 | McAllister | |
| 2006/0082439 A1 | 4/2006 | Bazakos et al. | |
| 2006/0244662 A1* | 11/2006 | Bauer et al. | 343/700 MS |
| 2007/0040688 A1 | 2/2007 | Cocita et al. | |
| 2007/0097009 A1* | 5/2007 | Torres | 343/795 |
| 2007/0152901 A1 | 7/2007 | Hockey et al. | |

(Continued)

FOREIGN PATENT DOCUMENTS

WO WO-00/48019 A1 8/2000

OTHER PUBLICATIONS

"RF IDentics," <http://www.rfidentics.com/products.html>, dated Mar. 26, 2007.

(Continued)

Primary Examiner — Hai Phan
Assistant Examiner — Ojiako Nwugo
(74) Attorney, Agent, or Firm — Alston & Bird LLP

(57) ABSTRACT

An RFID tag and an RFID access card configured to reduce detuning effects from a typical RFID environment. The present invention provides an RFID tag that is specifically configured to reduce the detuning effects caused by initiating communication between an RFID tag and an RFID tag reader in the presence of materials such as metal, liquid, and the human body. In one embodiment, the present invention provides an RFID tag comprising an electronic circuit portion attached to a main antenna body portion, the main antenna body portion having two opposite side portions, which are substantially symmetrical with respect to one another, wherein each side portion extends outwardly to form a generally side-oriented v-shape.

20 Claims, 12 Drawing Sheets

(56) References Cited

U.S. PATENT DOCUMENTS

| | | | |
|---|---|---|---|
| 2007/0194999 A1* | 8/2007 | Morton | 343/767 |
| 2007/0205861 A1* | 9/2007 | Nair et al. | 340/5.61 |
| 2007/0241982 A1 | 10/2007 | Stigliani et al. | |

OTHER PUBLICATIONS

The International Search Report and Written Opinion for International Application No. PCT/US2008/057790, mailed Aug. 18, 2008.

* cited by examiner

RFID TAG WITH REDUCED DETUNING CHARACTERISTICS

CROSS-REFERENCE TO RELATED APPLICATIONS

This application is a continuation of U.S. application Ser. No. 12/053,109, filed Mar. 21, 2008, which claims priority to U.S. Provisional Application No. 60/896,780, filed Mar. 23, 2007, both of which are incorporated herein in their entireties by reference.

FIELD OF THE INVENTION

The present invention is directed to automatic identification devices and more specifically to an RFID tag design that improves antenna detuning.

BACKGROUND OF THE INVENTION

The use of Electronic Article Surveillance, Radio Frequency Identification, and electronic security tag technology (hereinafter collectively referred to as 'RFID') is becoming increasingly prevalent in manufacturing, inventory control, retail and residential settings. RFID technology provides efficient, instantaneous communication between a reader and an RFID tag without direct line-of-sight scanning, as is commonly required in more conventional automatic identification technologies (e.g., bar-code, optical scanning, etc.). RFID technology involves the transmission of information through radio waves. A typical RFID system includes an RFID tag and an RFID reader/encoder. First used many decades ago in military and espionage applications, RFID technology is now emerging as a valuable tool in commercial and domestic settings. For example, RFID technology is used by manufacturers or retailers to instantaneously track product inventories and thereby adjust to specific inventory needs. Similarly, RFID technology can be used by automobile commuters to pay highway tolls without interrupting their commute, or by pet owners to provide reassurance that pets are readily locatable, regardless of lost collars.

RFID tags typically include an electronic circuit chip and an antenna attached to the circuit chip. The circuit chip and antenna are generally thin, flexible, and mounted to a flexible dielectric substrate. Antennas have numerous configurations and each is structured generally to collect and broadcast electromagnetic energy from a distant reader. RFID chips can be programmed to store a variety of information. For example, RFID chips often include retail product identification such as a product serial number. In other applications, relatively more complex information may be provided such as biometric information on an employee ID badge. Such applications may include "smart cards," which include an RFID tag or inlay integrated into the card.

RFID tag and reader systems may operate over a wide range of frequencies, including low-frequency (LF) applications, high-frequency (HF) applications, and ultra-high-frequency applications (UHF). LF applications typically operate from 125-148.5 kHz. HF applications typically operate at 13.56 MHz. UHF applications typically operate from 300 MHz to 3 GHz. The "read range" of an RFID tag and reader system is often defined as the distance from which a reader can communicate with a tag. Read ranges can be affected by variety of factors. For example, active RFID tags (as opposed to passive RFID tags) have independent power sources (typically batteries), and have relatively longer read range. However, active RFID tags are more expensive and may be less reliable than passive RFID tags due to the need to replace the battery. In theory, passive RFID tags have an infinite life, but offer shorter read ranges.

Passive LF and HF applications offer very short read ranges, often requiring the RFID tag to be within 1 to 12 inches of a reader for successful communication. Passive UHF applications typically offer longer read ranges, allowing RFID tags to be within 2 to 5 meters or more of a reader for successful communication. However, various environmental factors can detune an RFID tag, thus modifying the operating frequency and potentially affecting the read range of the RFID tag. RFID tags in the presence of metals and liquids may experience detuning due to absorption or parasitic capacitance provided by these materials.

Additionally, due to the high water content of the human body, a user may detune an RFID tag simply by using it. This is especially troublesome for RFID tags (inlays) imbedded within access cards that are held by a user when read by a reader. For example, in certain instances, a user may unknowingly detune an RFID access card by obscuring the card while attempting to hold the card near a reader. In other instances, a user may detune an RFID access card by wearing the card on a lanyard such that the card is adjacent the user's body. Although strategic handling of the access card may reduce the detuning effect (such as handling the card only by its edges or extending the card away from the user's body), these solutions defeat the convenience and speed advantages provided by RFID technology.

As a result, there is a need for an improved RFID tag design that reduces various detuning effects, including that of a user handing an RFID tag in the presence of a reader.

BRIEF SUMMARY OF THE INVENTION

The present invention addresses the above needs and others by providing an RFID tag configured to reduce detuning effects from a typical RFID environment. More specifically, the present invention provides an RFID tag and an RFID access card that are specifically configured to reduce the detuning effects caused by attempting communication with an RFID tag in the presence of materials such as metal, liquid, and the human body.

In one embodiment, the present invention provides an RFID tag comprising an electronic circuit attached to a main antenna body. The main antenna body defines a center through which an imaginary pair of first and second perpendicular axes intersect and comprises two opposite side portions, wherein each side portion is substantially symmetrical with respect to itself about the second imaginary axis, and wherein each side portion extends outwardly from the first imaginary axis along the second imaginary axis to form a generally side-oriented v-shape, defined by upper and lower angled edges and upper and lower side edges, and wherein the main antenna body further comprises an elongate first slot that extends from the center of the main antenna body, substantially along the second imaginary axis, and a second slot substantially perpendicular to and intersecting the first slot proximate the center of the main antenna body.

In another embodiment, the RFID tag may operate on the UHF range. In another embodiment, the upper and lower angled edges may extend from the first imaginary axis at a substantially constant angle $\alpha$. The angle $\alpha$ may be in the range of about 10° to about 85°, and may preferably be in the range of about 40° to about 85°. In another embodiment, the electronic circuit may be attached proximate the intersection of the first and second slots. In another embodiment, the upper and lower side edges are separated by a notch substantially located along the second imaginary axis, wherein the notch separating the upper and lower side edges may have a side oriented v-shape defined by an upper notch edge and a lower notch edge, wherein the upper notch edge is substantially parallel to the upper angled edge and the lower notch edge is substantially parallel to the lower angled edge.

In another embodiment, the elongate slot may define a slot half-length, wherein the slot half-length may be in the range of about 5 mm to about 30 mm (i.e., about 10 mm to about 50 mm for the full length of the slot), and may preferably be in the range of about 15 mm to 25 mm. In another embodiment, the elongate slot may define a slot height, wherein the slot height may be in the range of about 0.5 to about 5 mm, and may preferably be approximately 1 mm. In another embodiment, the RFID tag further comprises a back plate located on one side of the RFID tag and configured to shield the RFID tag. The back plate may be comprised of a metal material.

In still another embodiment, the present invention provides an RFID tag comprising an electronic circuit attached to a main antenna body, the main antenna body defining a center through which an imaginary pair of first and second perpendicular axes intersect and comprising two opposite side portions, wherein each side portion is substantially symmetrical with respect to itself about the first imaginary axis, and wherein each side portion extends outwardly from the center along the second imaginary axis to form a shape having a relatively large surface area, and wherein the main antenna body further comprises an elongate first slot that extends from the center of the main antenna body, substantially along the second imaginary axis, and a second slot substantially perpendicular to and intersecting the first slot proximate the center of the main antenna body. In another embodiment, the RFID tag further includes a back plate comprised of a metal material located on one side of the RFID tag and configured to shield the RFID tag. In another embodiment, each side portion of the main antenna body extends outwardly from the first imaginary axis along the second imaginary axis to form a generally side-oriented v-shape, wherein the opposite side portions further comprise convex upper edges, each defining respective vertex points.

BRIEF DESCRIPTION OF THE DRAWINGS

Figure 1:
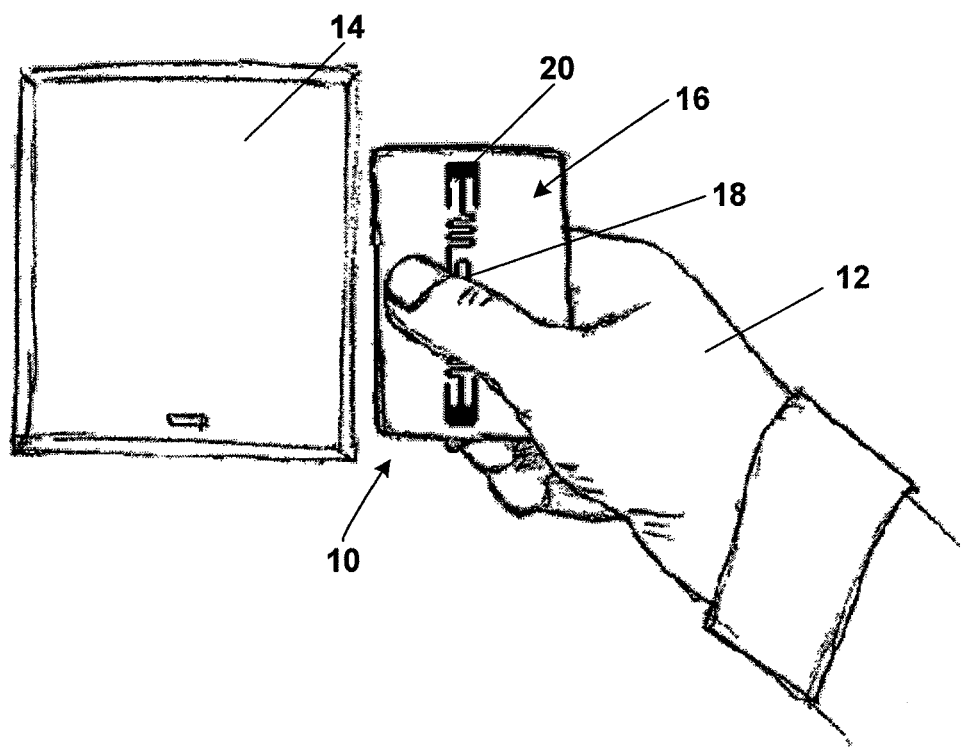
Figure 2:
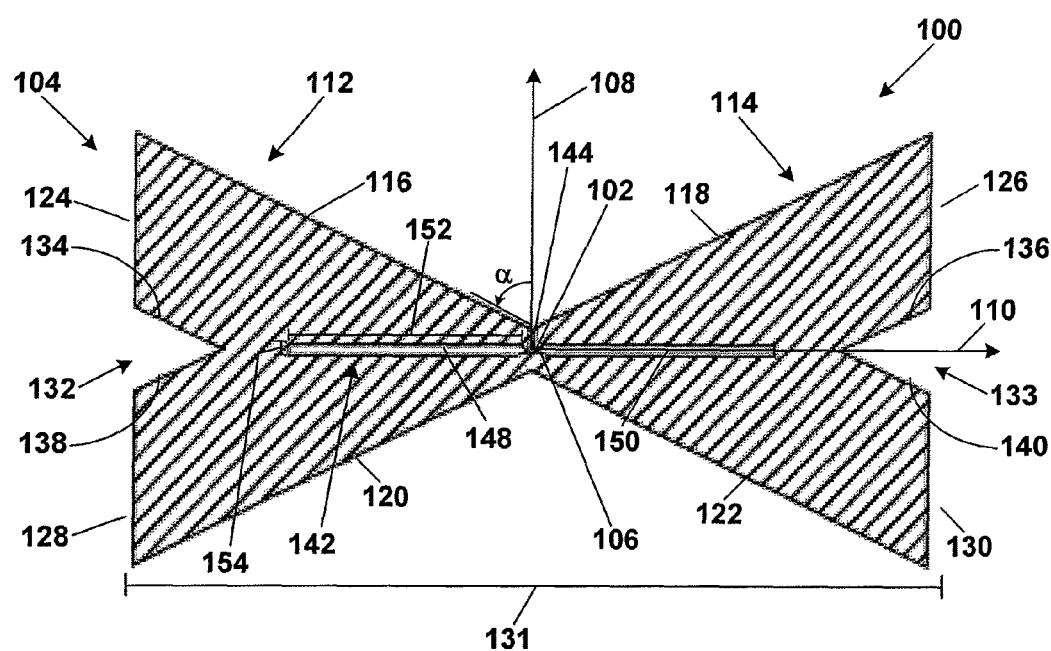
Figure 3:
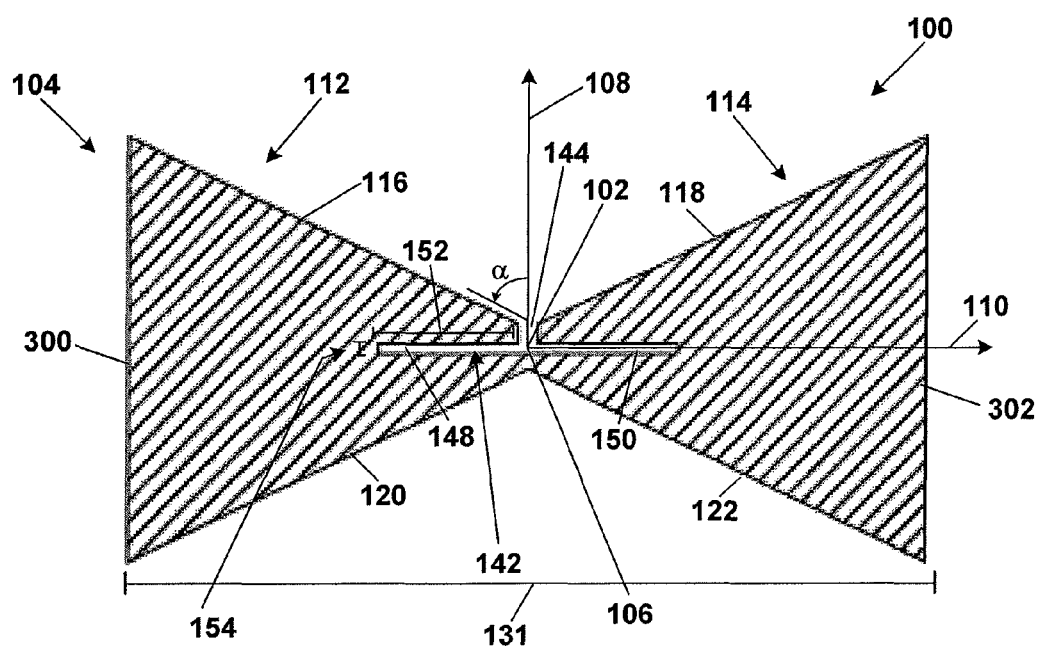
Figure 4:
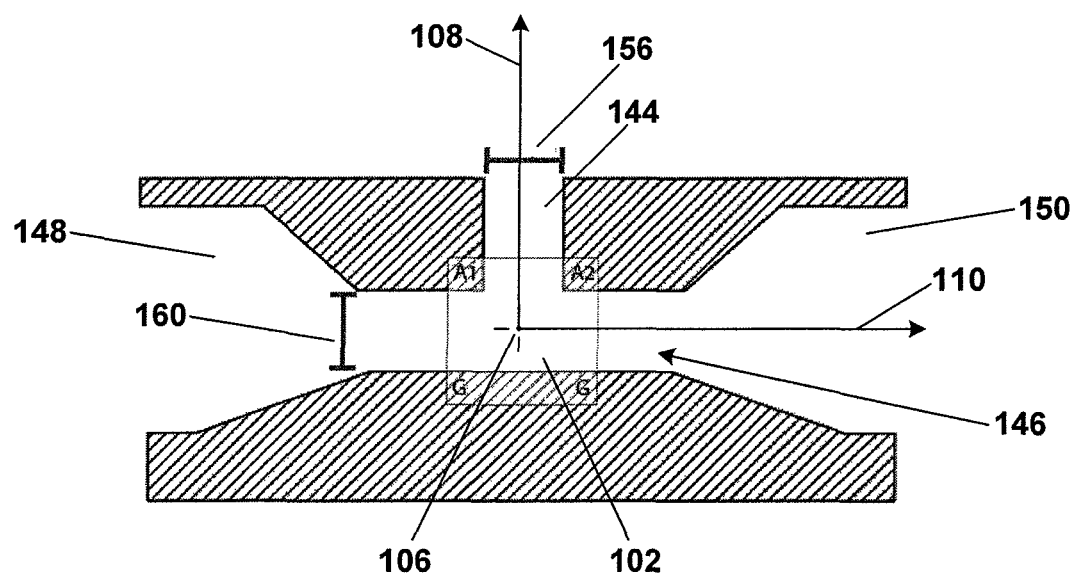
Figure 5:
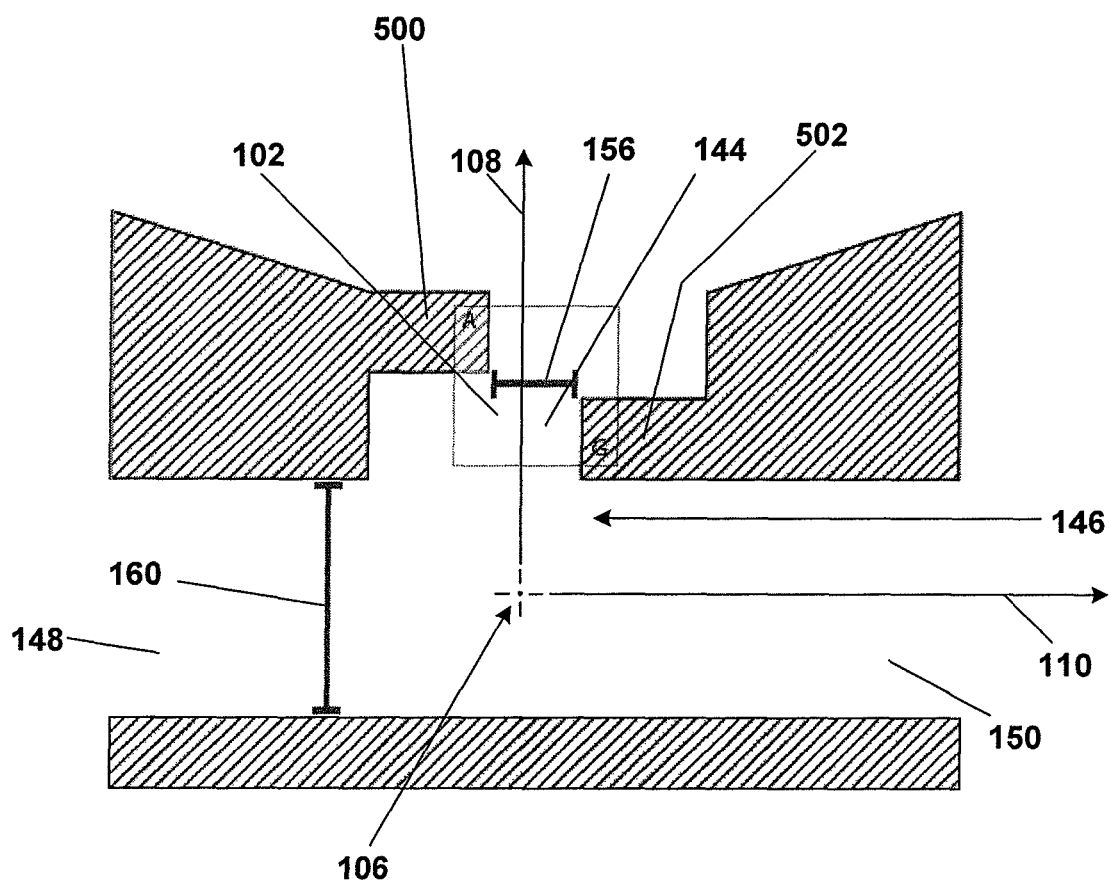
Figure 6:
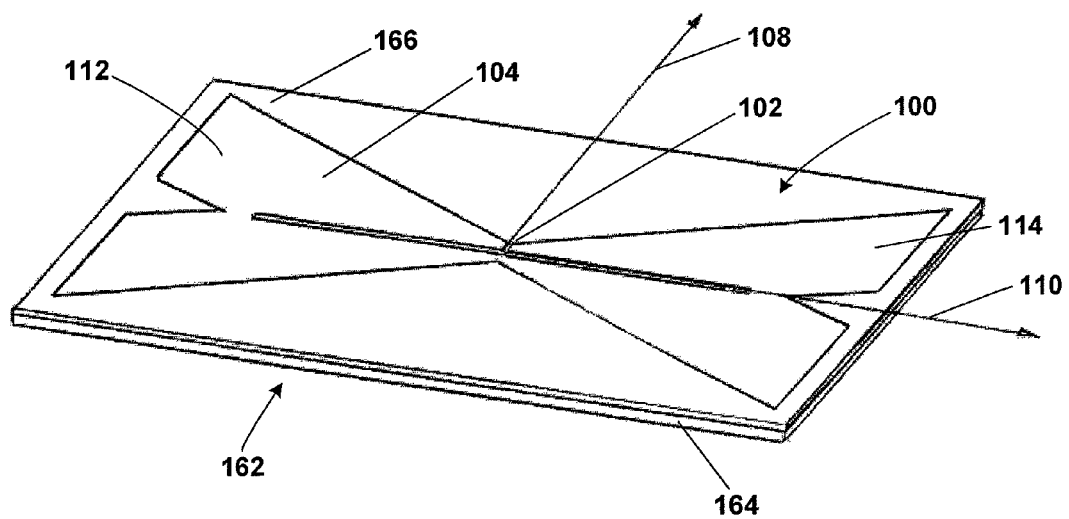
Figure 7:
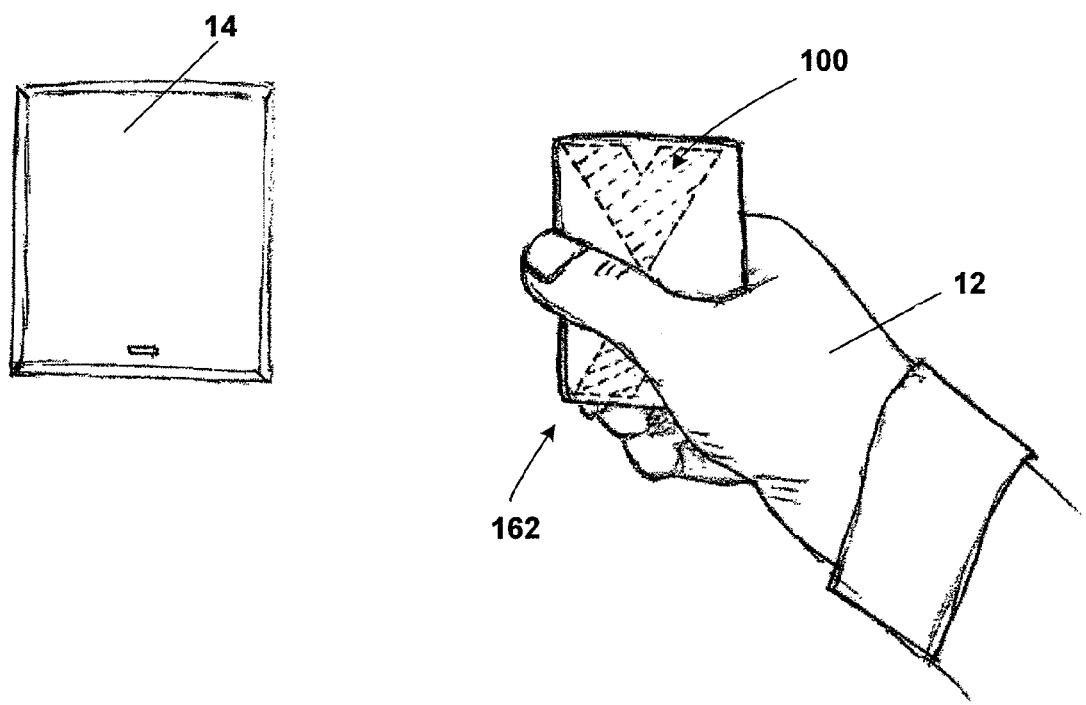
Figure 8:
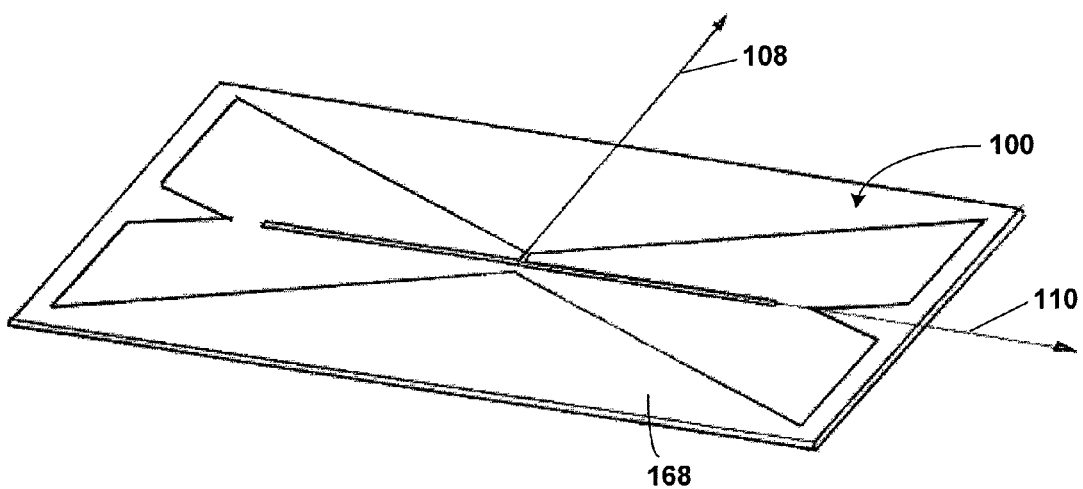
Figure 9:
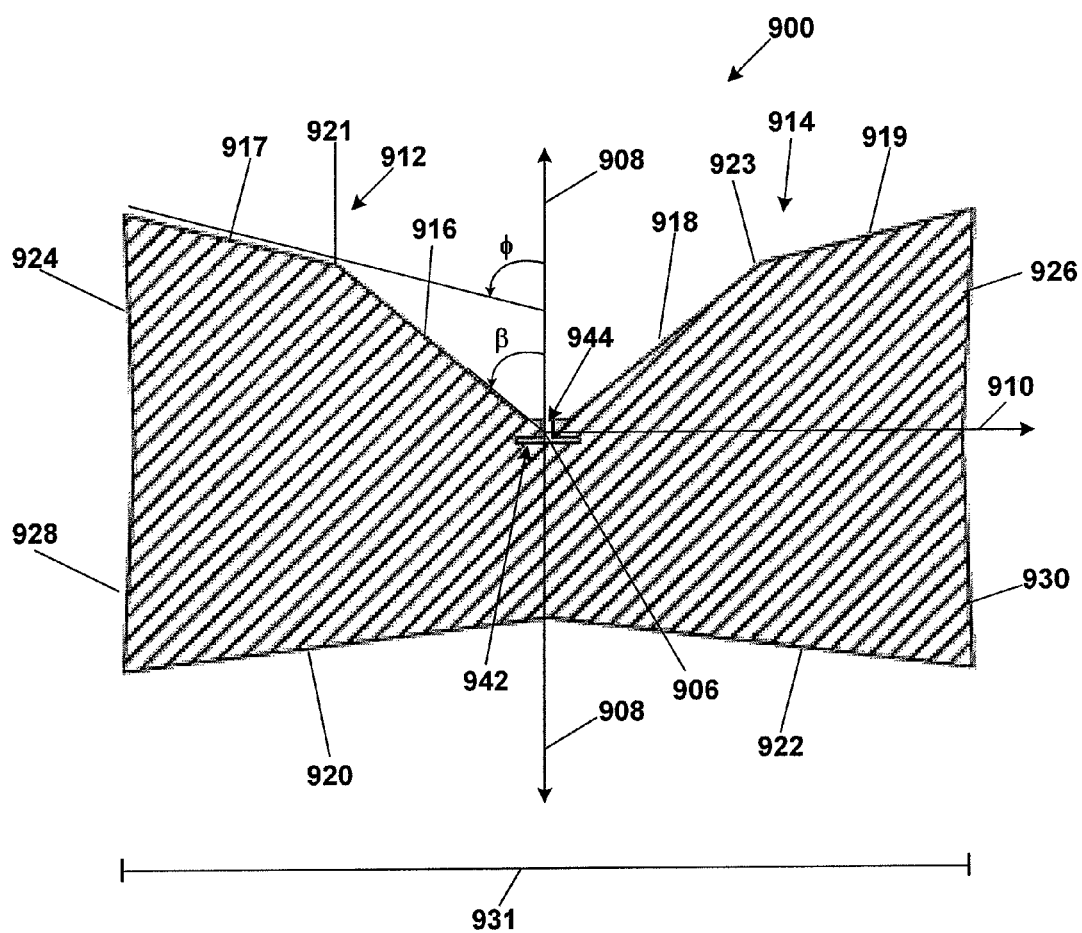
Figure 10:
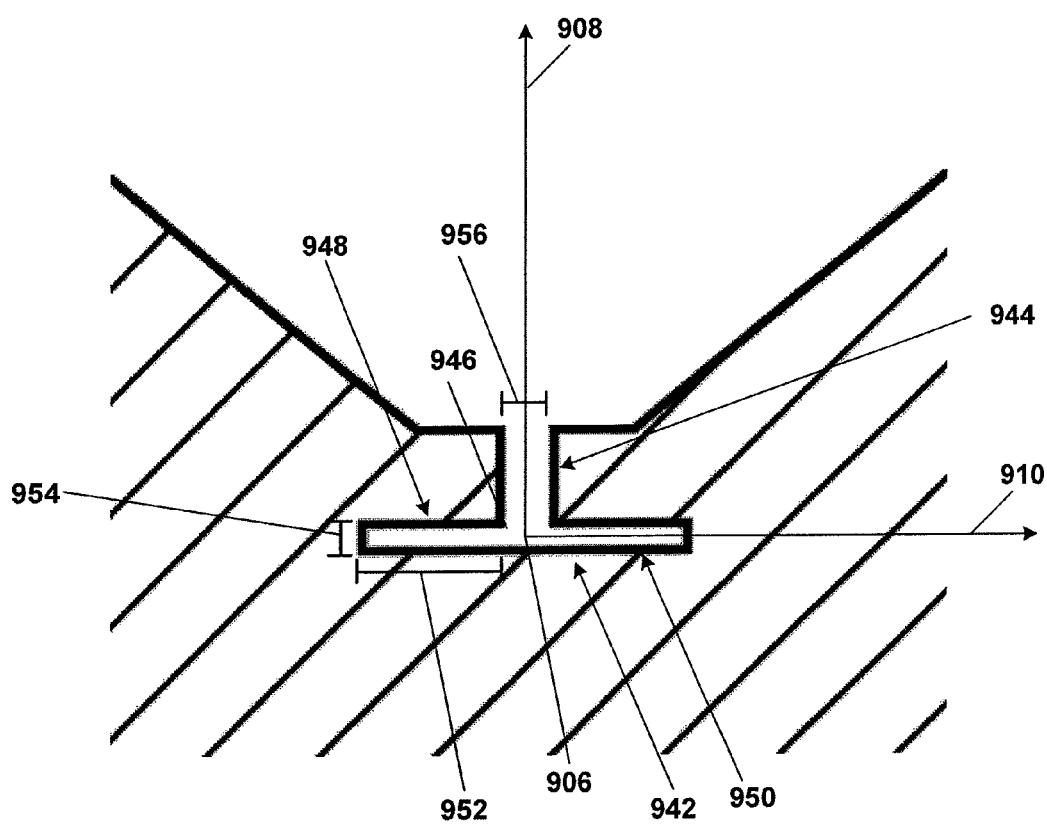
Figure 11:
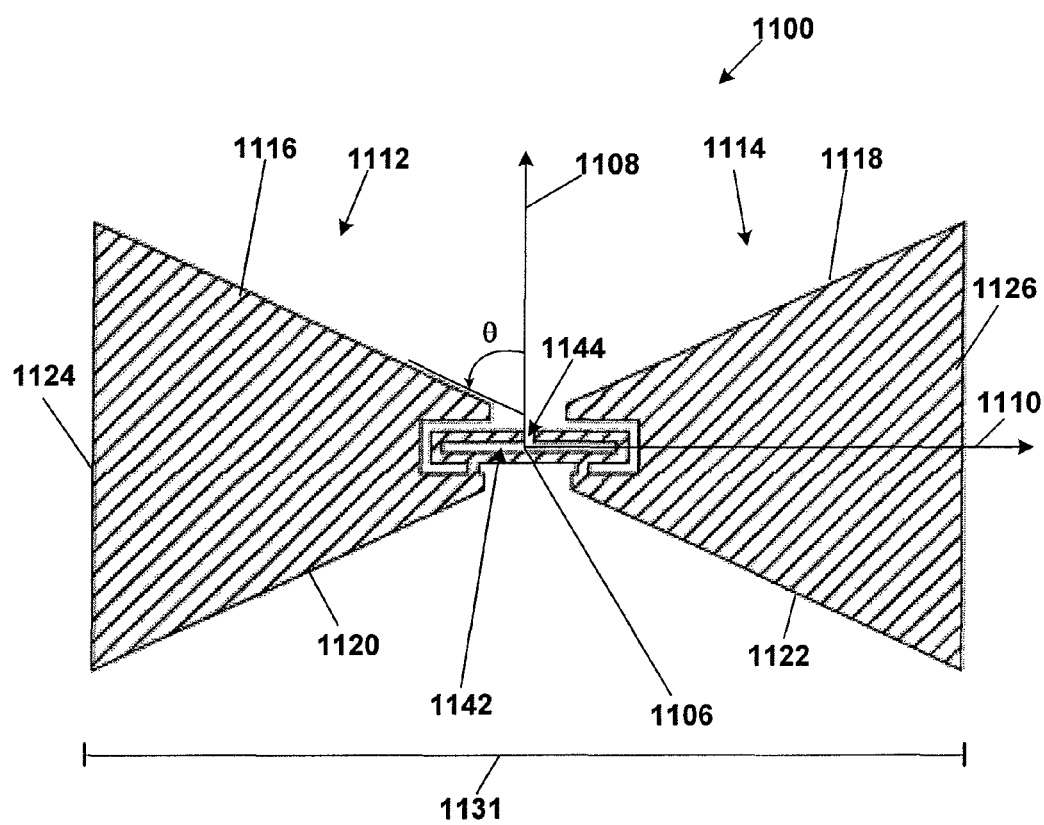
Figure 12:
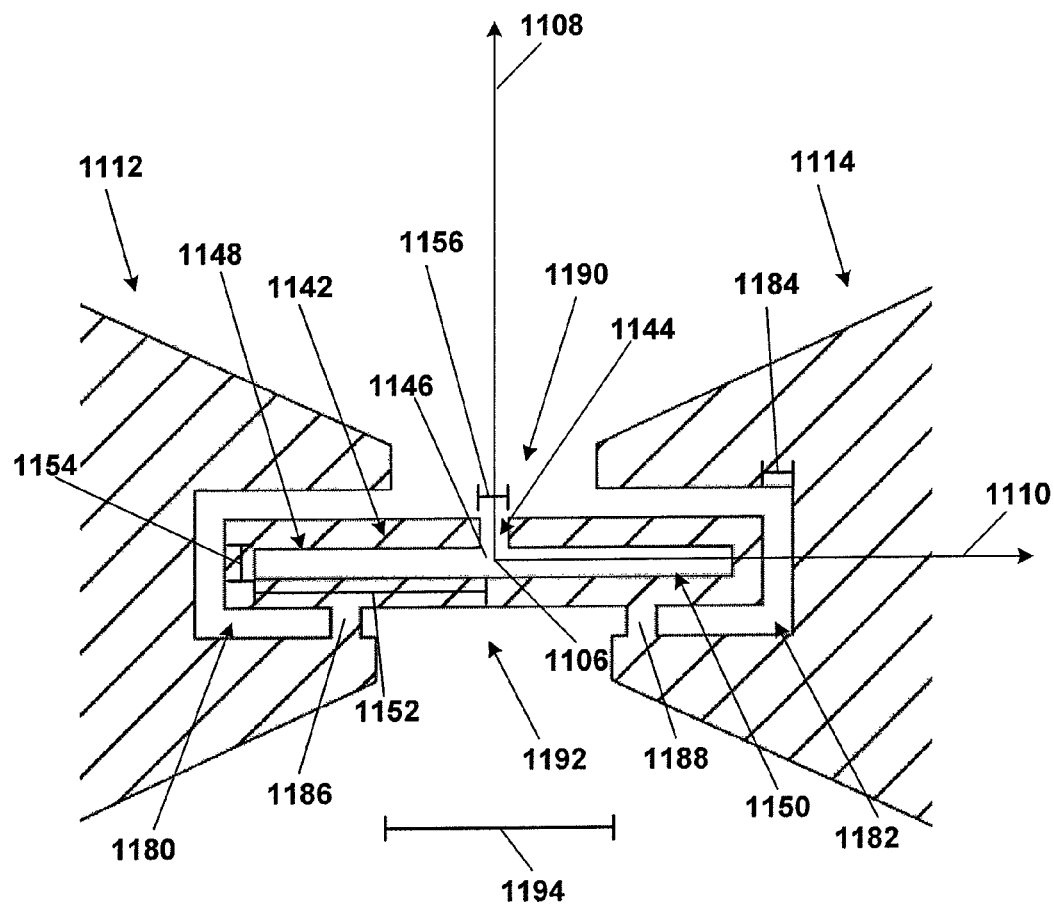

Having thus described the invention in general terms, reference will now be made to the accompanying drawings, which are not necessarily drawn to scale, and wherein:

FIG. 1 shows a user attempting to initiate communication between a prior art UHF RFID access card and an associated RFID access card reader;

FIG. 2 shows an RFID tag having reduced detuning characteristics in accordance with one embodiment of the present invention;

FIG. 3 shows an RFID tag having reduced detuning characteristics in accordance with one embodiment of the present invention;

FIG. 4 is a detailed view showing an electronic circuit attached to a main antenna body in accordance with one embodiment of the present invention;

FIG. 5 is a detailed view showing an electronic circuit attached to a main antenna body in accordance with one embodiment of the present invention;

FIG. 6 shows a perspective view of an RFID access card that includes an RFID tag having reduced detuning characteristics in accordance with one embodiment of the present invention;

FIG. 7 shows a user initiating communication between an RFID access card and an associated RFID access card reader, the RFID access card including a UHF RFID tag having reduced detuning characteristics in accordance with one embodiment of the present invention;

FIG. 8 shows an RFID tag with a back plate in accordance with another embodiment of the present invention;

FIG. 9 shows an RFID tag in accordance with another embodiment of the present invention;

FIG. 10 is a detailed view showing a center area of an RFID tag in accordance with one embodiment of the present invention;

FIG. 11 shows an RFID tag in accordance with another embodiment of the present invention; and FIG. 12 is a detailed view showing a center area of an RFID tag in accordance with one embodiment of the present invention.

DETAILED DESCRIPTION OF THE INVENTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

Security access points, such as those located in office buildings and the like, often employ RFID technology. Typical applications include RFID access cards configured to be read by RFID access card readers. These access cards are issued to authorized users and allow the users to gain access through various security access points. To gain access through a typical security access point, a user may grasp and bring his/her access card in close proximity to an associated access card reader. In some instances, a user may hang his/her access card from a lanyard worn around the user's neck. In other instances, a user may attach his/her access card to a retractable device attached to the user's clothing. In any event, the user's body may have a detuning effect on an RFID tag located within the access card.

FIG. 1 shows prior art RFID access card 10 held by a user 12 in close proximity to an RFID access card reader 14. The RFID access card 10 includes an RFID tag 16 comprising an electronic circuit 18 and an antenna 20. The RFID access card of FIG. 1 operates in the UHF range and employs a passive RFID tag 16. As shown in the figure, the antenna 20 of the prior art RFID access card 10 extends in an approximate oval or rounded rectangular shape around the periphery of the access card 10, with the electronic circuit 18 located on one end of the card 10. A user 12 using a prior art RFID access card 10 in the manner shown in the drawing would likely detune the RFID tag 16 with his/her hand by obscuring and/or being in close contact with a large portion of the perimeter-oriented antenna 20. The result of such detuning would require the user 12 to reorient the access card 10 and/or to bring the access card 10 even closer to the access card reader 14. Although not shown in the figure, a user wearing an RFID access card 10 against his/her body on a lanyard or other retractable device would likewise detune the RFID tag 16 either by handling the access card 10 with his/her hands to initiate communication between the reader 14 and the card 10, or by attempting to initiate communication between the reader 14 and the access card 10 with the card abutting the user's body. In any event, requiring a user to reorient or otherwise reattempt communication between the access card 10 and the card reader 14 defeats the advantages provided by RFID technology.

The present invention addresses these concerns and others by providing an RFID tag that is configured to reduce common environmental detuning effects. As will be discussed in more detail below, the structure of the RFID tag of various embodiments of the present invention is especially optimized to reduce the detuning effects commonly caused by the handling of UHF RFID tags (and access cards utilizing said tags) during communication with a reader. In accordance with these and other objectives, the inventor of the present invention has determined that RFID tags configured as described in more detail below, provide improved communication with a reader when handled or otherwise subjected to common human and other environmental detuning effects. In certain instances, an RFID tag configured according to an exemplary embodiment of the present invention may provide as much as 50% better performance than conventional tag designs.

FIG. 2 shows an RFID tag 100 in accordance with one embodiment of the present invention. The RFID tag 100 of the depicted embodiment includes an electronic circuit 102 and a main antenna body 104. The electronic circuit 102 of the depicted embodiment is of a type typically used in UHF RFID applications, and may have a variety of configurations, including, but not limited to, a dual terminal configuration, an example of which is depicted in FIG. 4, or a single terminal configuration, an example of which is depicted in FIG. 5. Such electronic circuits are available from a variety of manufacturers including, but not limited to, electronic RFID circuits provided by Impinj, Inc, such as the Monza™ Gen 2 tag chip, and the G2XM circuit provided by NXP Semiconductors. These circuits may also be referred to as microcircuits, IC's, silicon chips, microcircuits, computer chips, chips, etc. The main antenna body 104 of the depicted embodiment of the present invention defines a center 106. Two imaginary axes, a first axis 108 and a second axis 110, extend through the center 106 substantially perpendicular to each other.

The main antenna body 104 comprises two side portions 112, 114. The main antenna body side portions 112, 114 are substantially symmetrical with respect to one another about the first imaginary axis 108, and each side portion 112, 114 is substantially symmetrical with respect to itself about the second imaginary axis 110. Each of the main antenna body side portions 112, 114 forms a general side oriented v-shape defined by upper angled edges 116, 118, lower angled edges 120, 122, upper side edges 124, 126, and lower side edges 128, 130. The upper and lower angled edges 116, 118 and 120, 122 extend outwardly from the first imaginary axis 108 at an angle α relative to the first imaginary axis 108 from an area proximate the center 106 of the main antenna body 104. A distance 131 between the side edges 124, 128 and 126, 130 defines an overall tag length. The upper side edges 124, 126 and the lower side edges 128, 130 are separated by notches 132, 133, which are substantially located along the second imaginary axis 110. In the depicted embodiment, each notch 132, 133 has a general side-oriented v-shape defined by upper notch edges 134, 136 and lower notch edges 138, 140. It should be noted, however, that in other embodiments, the shape of the notch may be varied, for example, the notch may have a curved u-shape, a squared u-shape, a partial circular profile, etc. The main antenna body 104 also includes an elongate first slot 142 that extends outwardly substantially along the second imaginary axis 110. A second slot 144 is located substantially along the first imaginary axis 108 and intersects the first slot 142 proximate the center 106 of the main antenna body 104. In the depicted embodiment, the configuration of the main antenna body 104 serves to distribute antenna material radially outward from the electronic circuit in a certain pattern thus decreasing typical detuning effects. Although desiring not to be bound by any particular theory, in effect, the structure of the main antenna body 104 of the present invention behaves similar to two separate antennas separated by the first imaginary axis 108. In reality the two sides are not completely independent, however they behave that way when one side is subject to a detuning condition. Although the depicted embodiment of the present invention shows side portions that have a general side-oriented v-shape, in other embodiments the side portions may have any other configuration having relatively large surface areas that extend from the center 106, including, but not limited to, diamond shaped side portions and circular shaped side portions. Furthermore, although not shown in the figures, side portions of an RFID tag in accordance with other embodiments of the present invention may be tuned slightly differently. For example one side may be tuned to a particular operating frequency (e.g., 920 MHz) and the other side may be tuned to a different operating frequency (e.g., 905 MHz), thus extending the overall bandwidth. The two sides could also be tuned to different regulatory environments. For example, one side could be tuned to EU (e.g, 868 MHz) and the other could be tuned to Japan (e.g., 950 MHz). In such embodiments, the side portions may have different shapes, such as where an angle α on one side is different than an angle α' on the other. Additionally, the slot half-length could be different for each side.

FIG. 3 shows an alternative embodiment of RFID tag 100 in accordance with one embodiment of the present invention. The RFID tag 100 of the depicted embodiment includes an electronic circuit 102 which may have a variety of configurations, and a main antenna body 104. The main antenna body 104 of the depicted embodiment of the present invention defines a center 106. Two imaginary axes, a first axis 108 and a second axis 110, extend through the center 106 substantially perpendicular to each other.

The main antenna body 104 comprises two side portions 112, 114. The main antenna body side portions 112, 114 are substantially symmetrical with respect to one another about the first imaginary axis 108, and each side portion 112, 114 is substantially symmetrical with respect to itself about the second imaginary axis 110. Each of the main antenna body side portions 112, 114 forms a general v-shape defined by upper angled edges 116, 118, lower angled edges 120, 122, and side edges 300, 302. The upper and lower angled edges 116, 118 and 120, 122 extend outwardly from the first imaginary axis 108 at an angle α relative to the first imaginary axis 108 from an area proximate the center 106 of the main antenna body 104. A distance 131 between the side edges 300, 302 defines an overall tag length. The main antenna body 104 also includes an elongate first slot 142 that extends outwardly substantially along the second imaginary axis 110. A second slot 144 is located substantially along the first imaginary axis 108 and intersects the first slot 142 proximate the center 106 of the main antenna body 104. In the depicted embodiment, the configuration of the main antenna body 104 serves to distribute antenna material radially outward from the electronic circuit in a certain pattern thus decreasing typical detuning effects. Although desiring not to be bound by any particular theory, in effect, the structure of the main antenna body 104 of the present invention behaves similar to two separate antennas separated by the first imaginary axis 108. In reality the two sides are not completely independent, however they behave that way when one side is subject to a detuning condition.

FIG. 4 shows an exemplary detailed view of the main antenna body 104 for an electronic circuit 102 that is a dual-terminal electronic circuit. Note that while FIG. 4 describes aspects of RFID tag 100, the description can refer to aspects any RFID tag embodiment in accordance with the present invention. The elongate first slot 142 includes an inner portion 146 that connects two side slot portions 148, 150. The elongate first slot 142 also defines a slot half-length 152 and a slot height 154 (both shown in FIG. 2). The second slot 144 defines a second slot width 156. The inner portion 146 defines an inner portion height 160. As shown in the figure, the electronic circuit 102 attaches to the main antenna body 104 proximate the center 106 and across the intersection of the inner portion 146 and the second slot 144. The electronic circuit 102 of the depicted embodiment includes four ports, A1, A2, and grounds G, G, which are attached to the main antenna body 104 as shown.

FIG. 5 shows another exemplary detailed view of the main antenna body 104 for an electronic circuit 102 that is a single-terminal electronic circuit. Note that while FIG. 5 describes aspects of RFID tag 100, the description can refer to aspects any RFID tag embodiment in accordance with the present invention. The elongate first slot 142 includes an inner portion 146 that connects two side slot portions 148, 150. The elongate first slot 142 also defines a slot half-length 152 and a slot height 154 (both shown in FIG. 2 and FIG. 3). The second slot 144 can be defined by tabs 500, 502. The second slot 144 defines a second slot width 156. Second slot width 156 may be a width between tab 500 and tab 502 with respect to the axis 110. The inner portion 146 defines an inner portion height 160. In some embodiments, the inner portion height 160 may be equivalent to the slot height 154. As shown in the figure, the electronic circuit 102 attaches to the main antenna body 104 proximate the center 106 and across the second slot 144. The electronic circuit 102 of the depicted embodiment includes two ports, A and G, which are attached to the main antenna body 104 via tabs 500, 502 as shown.

As shown in FIG. 6, an RFID tag 100 in accordance with various embodiments of the present invention may be configured to be used in connection with an RFID access card 162. Note that while FIG. 6 depicts RFID tag 100, any RFID tag embodiment in accordance with the present invention may be used as the RFID tag described with respect to FIG. 6. In such embodiments, the RFID tag 100 represents an inlay within card substrate 164. A top laminate 166 may be placed above the RFID tag 100 to protect the electronic circuit 102 and antenna body 104 components and provide a surface receptive to printing. In the depicted embodiment, the RFID tag 100 is approximately 3 to 9 mils (i.e., 75 to 225 microns (μm)) thick. The depicted embodiment shows a simplified version of an RFID access card. In other embodiments, an RFID access card may include five layers, including a protective top layer constructed of a PET, PVC, or other similar material, a PVC intermediate layer, an RFID inlay on a PET layer, another PVC intermediate layer, and a bottom protective layer constructed of PET, PVC, or other similar material. Locating the electronic circuit 102 proximate the center 106 of the main antenna body 104 and providing side portions 112, 114 aids in providing less orientation dependence than prior art access cards where the electronic circuit may be located on one end of the access card. Additionally, as will be discussed below, the specific configuration of the main antenna body 104 further improves detuning performance.

In order to determine an optimal configuration for reducing detuning effects, several parameters involved in the design and manufacture of a UHF RFID access card may be chosen. Such parameters include, but are not limited to, the configuration of the antenna, the impedance of the electronic circuit, the composition of the chip attachment adhesive, the antenna material (e.g, silver ink, copper, aluminum, etc), the antenna material thickness and conductivity, the antenna substrate thickness and dielectric constant, the card laminate material (e.g, PVC, PET, polycarbonate, etc.), the laminate material thickness and dielectric constant, and variations within the frequency range of the regulatory environment (e.g, U.S.: 902-928 MHz, EU: 866-868 MHz, Japan: 950-956 MHz). The inventor of the present invention has determined that configuring an RFID tag as shown in the figures and as described in the claims, substantially reduces the detuning effects caused by typical environmental conditions, despite variations in the other parameters.

Referring back to FIG. 2 and FIG. 3, an antenna configuration for an optimized RFID tag 100 in accordance with one exemplary embodiment of the present invention is shown. Note that while the configuration parameters described below refer to RFID tag 100, any RFID tag embodiment in accordance with the present invention may include the configuration parameters described below. By configuring an RFID tag 100 in accordance with this exemplary embodiment of the present invention, better communication between the RFID tag 100 and a tag reader may be achieved. In the exemplary embodiment, the upper 116, 118 and lower 120, 122 angled edges of the main antenna body 104 extend from the first imaginary axis 108 at a constant angle α that is between about 10° and about 85° and is preferably between about 40° and about 85°. In some embodiments, α may be 65°. The tag length 131 is approximately 80 mm, which allows the RFID tag 100 to be used as an inlay for an access badge, the standard length of which is typically about 86 mm. The slot height 154 of the depicted embodiment is between about 0.5 mm and about 5 mm and is preferably about 1 mm. The slot half length 152 (i.e., the length from the first imaginary axis 108 of each side portions 148, 156) is between about 10 mm and about 50 mm, and is preferably between about 15 mm and about 25 mm. The second slot width 156 and the inner portion height 160 are both approximately 350 μm. Although not referenced in the figure, the overall height of the RFID tag 100 of the depicted embodiment of the present invention is approximately 42 mm. With reference to FIG. 2, each notch is approximately 8 mm in height, and has an approximate length of 9 mm. It should be noted that although the above describes the approximate dimensions of the depicted embodiment, many other configurations within the scope of the present invention are possible.

Referring to FIG. 7, an access card 162 having an RFID tag 100 configured according to an exemplary embodiment of the present invention is shown being used by a user 12 in a similar manner as shown with respect to the prior art access card 10 of FIG. 1. Note that while FIG. 7 depicts RFID tag 100, any RFID tag embodiment in accordance with the present invention may be used as the RFID tag described with respect to FIG. 7. In the depicted embodiment, however, the detuning effects caused by the user's hands are reduced due to the optimized configuration of the RFID tag 100. Regardless of the manner in which the user handles the access card 162, the configuration of the RFID tag 100 allows improved communication between the access card reader 14 and the access card 162. Likewise, although not shown in the figure, an access card 162 in accordance with an exemplary embodiment placed on a lanyard or other retractable device also provides better communication between the access card reader 14 and the access card 162 by reducing the detuning effects of a user's body. In certain instances, an RFID tag 100 configured according to an exemplary embodiment of the present invention may provide 30%-50% better performance than conventional tag designs.

FIG. 8 shows another embodiment of the present invention. In the depicted embodiment, an additional component comprising a back plate 168 may be added behind the RFID tag 100. Note that while FIG. 8 depicts RFID tag 100, any RFID tag embodiment in accordance with the present invention may be used as the RFID tag described with respect to FIG. 8. In various embodiments, the back plate 168 may be comprised of a thin film of metal material, including, but not limited to, aluminum, copper, etc. The back plate 168 serves to shield electromagnetic radiation from one direction of the RFID tag. An embodiment such as this may be particularly advantageous for use with metal objects and/or objects that contain liquid, or for access cards attached to a lanyard and worn around a user's neck. As noted above, materials such as metal, liquid, and the human body tend to detune the RFID tag. By utilizing a back plate 168 in accordance with various embodiments of the present invention, electromagnetic waves are directed away from the back plate 168. As a result, a back plate 168 may be placed between the object (or in the case of an access card, the user's body) and the RFID tag 100, thus further decreasing detuning effects caused by the user or the object.

In the depicted embodiment, the back plate 168 is a similar material to the RFID tag 100, for example silver ink, copper, aluminum, etc. The thickness of the back plate 168 of the depicted embodiment is approximately 10 to 35 microns and it is separated from the RFID tag 100 by a distance of about 0.5 mm to about 3 mm. In various embodiments, the back plate may be separated from the RFID tag 100, by a dielectric layer. The dielectric layer may be made of PET, PVC, or other similar material. In various embodiments, the dielectric layer may have a thickness of about 0.5 mm to about 3 mm and may be any type of substance having a dielectric constant between 1 and 10.

FIG. 9 shows an RFID tag 900 in accordance with another embodiment of the present invention. The RFID tag 900 of the depicted embodiment of the present invention defines a center 906. Two imaginary axes, a first axis 908 and a second axis 910, extend through the center 906 substantially perpendicular to each other.

In the depicted embodiment, the RFID tag 900 comprises two side portions 912, 914. The side portions 912, 914 are substantially symmetrical with respect to one another about the first imaginary axis 908. Each of the side portions 912, 914 forms a general side oriented v-shape defined by first upper angled edges 916, 918, second upper angled edges 917, 919 lower angled edges 920, 922, upper side edges 924, 926, and lower side edges 928, 930. The first upper angled edges 916, 918 extend outwardly from the first imaginary axis 908 at an angle $\beta$ relative to the first imaginary axis 908 from an area proximate the center 906 of the RFID tag 900. The second upper angled edges 917, 919 extend outwardly from the first imaginary axis 908 at an angle $\phi$ relative to the first imaginary axis 908 from upper edge vertex points 921, 923. In some embodiments, the angle $\phi$ may have a measured value greater than the measured value for the angle $\beta$. As a result, first upper angled edges 916, 918 and second upper angled edges 917, 919 may combine to create a convex edge on the upper edge of side portions 912, 914.

The lower angled edges 920, 922 extend outwardly from the first imaginary axis 108 at an angle relative to the first imaginary axis 108. Lower angled edges 920, 922 need not be linear edges and may include a vertex point where the angle of the lower edge changes. A distance 931 may be a maximum between the side edges 924, 928 and 926, 930, and may define an overall tag length. The upper side edges 924, 926 and the lower side edges 928, 930 may have an angle with respect to the second imaginary axis 910 such that upper side edge 924 and lower side edge 928 create a concave edge, and upper side edge 926 and lower side edge 930 create a concave edge. It should be noted, however, that in other embodiments, the shape of the upper side edges 924, 926 and lower side edges 928, 930 may be varied creating an overall side edge may have a curved u-shape, a squared u-shape, a partial circular profile, etc. The RFID tag 900 also includes an elongate first slot 942 that extends outwardly substantially along the second imaginary axis 910. A second slot 944 is located substantially along the first imaginary axis 908 and intersects the first slot 942 proximate the center 906 of the RFID tag 900.

In the depicted embodiment, the configuration of the RFID tag 900 serves to distribute antenna material radially outward from the center point 906 in a certain pattern thus decreasing typical detuning effects.

FIG. 10 shows an exemplary detailed view of the RFID tag 900. The elongate first slot 942 includes an inner portion 946 that connects two side slot portions 948, 950. The elongate first slot 942 also defines a slot half-length 952 and a slot height 954. The second slot 944 defines a second slot width 956. An electronic circuit (not pictured) may be located proximate the center 906 and across the intersection of the inner portion 946 and the second slot 944.

FIG. 11 shows an RFID tag 1100 in accordance with another embodiment of the present invention. The RFID tag 1100 of the depicted embodiment of the present invention defines a center 1106. Two imaginary axes, a first axis 1108 and a second axis 1110, extend through the center 1106 substantially perpendicular to each other.

In the depicted embodiment, the RFID tag 1100 comprises two side portions 1112, 1114. The side portions 1112, 1114 are substantially symmetrical with respect to one another about the first imaginary axis 1108. Each of the side portions 1112, 1114 forms a general side oriented v-shape defined by upper angled edges 1116, 1118, side edges 1124, 1126, and lower angled edges 1120, 1122. The upper angled edges 1116, 1118 extend outwardly from the first imaginary axis 1108 at an angle $\theta$ relative to the first imaginary axis 1108 from an area proximate the center 1106 of the RFID tag 1100. Upper angled edges 1116, 1118 need not be linear edges and may include a vertex point where the angle of the upper edge changes.

The lower angled edges 1120, 1122 extend outwardly from the first imaginary axis 1108 at an angle relative to the first imaginary axis 1108. Lower angled edges 1120, 1122 need not be linear edges and may include a vertex point where the angle of the lower edge changes. A distance 1131 between the side edges 1124 and 1126 may define an overall tag length. Side edges 1124, 1126 need not be linear edges and may include a vertex point where the angle of the side edge changes. The RFID tag 1100 also includes an elongate first slot 1142 that extends outwardly substantially along the second imaginary axis 1110. A second slot 1144 is located substantially along the first imaginary axis 1108 and intersects the first slot 1142 proximate the center 1106 of the RFID tag 1100.

In the depicted embodiment, the configuration of the RFID tag 1100 serves to distribute antenna material radially outward from the center point 1106 in a certain pattern thus decreasing typical detuning effects.

FIG. 12 shows an exemplary detailed view of the RFID tag 1100. The elongate first slot 1142 includes an inner portion 1146 that connects two side slot portions 1148, 1150. The elongate first slot 1142 also defines a slot half-length 1152 and a slot height 1154. The second slot 1144 defines a second slot width 1156. An electronic circuit (not pictured) may be located proximate the center 1106 and across the intersection of the inner portion 1146 and the second slot 1144. Side channels 1180, 1182 define a channel width 1184. Connecting areas 1186, 1188 may connect the material surrounding elongate first slot 1142 to side portions 1112, 1114. Connecting areas 1186, 1188 may located at any position within side channels 1180, 1182 such that connecting areas create a connection between the material surrounding elongate first slot 1142 and side portions 1112, 1114. Various locations of connecting area 1186, 1188 may affect the tuning of RFID tag 1100. Upper gap 1190 and lower gap 1192 may define gap width 1194.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An RFID (radio frequency identification) tag comprising:
   an electronic circuit attached to a main antenna body that is substantially bisected by a first axis, the main antenna body including:
   a first side antenna portion defined proximate a first side of the first axis;
   a second side antenna portion defined proximate a second side of the first axis;
   at least one connecting area; and
   an inner antenna portion, the inner antenna portion defining:
      a first slot substantially surrounded by the inner antenna portion, the first slot having an elongated shape extending in a direction generally perpendicular to the first axis;
      a second slot that channels through the inner antenna portion;
      a first side channel substantially between the first side antenna portion and the inner antenna portion; and
      a second side channel substantially between the second side antenna portion and the inner antenna portion,
   wherein the at least one connecting area connects the inner antenna portion to at least one of the first side antenna portion and the second side antenna portion.

2. The RFID tag of claim 1, wherein the at least one connecting area comprises:
   a first connecting area that connects the inner antenna portion to the first side antenna portion; and
   a second connecting area that connects the inner antenna portion to the second side antenna portion.

3. The RFID tag of claim 1, wherein the at least one connecting area defines a side of at least one of the first side channel and the second side channel.

4. The RFID tag of claim 3, wherein the location of the at least one connecting area affects tuning of the RFID tag.

5. The RFID tag of claim 1, wherein the first side antenna portion, the second side antenna portion, the at least one connecting area, and the inner antenna portion are comprised of one or more electrically conductive materials.

6. The RFID tag of claim 1, wherein the first slot that defines a first slot half-length and a first slot height, wherein the first slot half-length is greater than the first slot height.

7. The RFID tag of claim 6, wherein the second slot intersects the first slot.

8. The RFID tag of claim 1, wherein the first slot is comprised of an inner portion that connects a first side slot portion and a second side slot portion.

9. The RFID tag of claim 1, wherein the electronic circuit is positioned proximate the center of the first slot.

10. The RFID tag of claim 9, wherein the electronic circuit at least partially spans where the first slot and the second slot intersect.

11. The RFID tag of claim 1, wherein:
    the first side channel defines a first side channel width;
    the second side channel defines a second side channel width; and
    the first side channel width and the second side channel width are substantially the same.

12. The RFID tag of claim 1, wherein the first side antenna portion, the second side antenna portion, and the inner antenna portion are substantially symmetrical about the first axis.

13. The RFID tag of claim 1, wherein the first side antenna portion and the second side antenna portion extend outwardly from the inner antenna portion to form a generally side-oriented v-shape.

14. The RFID tag of claim 1, wherein the RFID tag operates in the UHF range.

15. The RFID tag of claim 1 further including a back plate comprised of a metal material located on one side of the RFID tag and configured to shield the RFID tag.

16. The RFID tag of claim 15 further including a dielectric layer between the metal material and the main antenna body.

17. The RFID tag of claim 1, wherein the RFID tag is incorporated into an RFID access card, the RFID access card comprising a card substrate to which the RFID tag is attached.

18. The RFID tag of claim 17 further including a back plate located on one side of the RFID tag and configured to shield the RFID tag.

19. The RFID tag of claim 18 further including a dielectric layer between the back plate and the main antenna body.

20. The RFID tag of claim 19, wherein a thickness of the dielectric layer is in the range of 0.5 mm to about 3.0 mm and a dielectric constant of the dielectric layer is in the range of 1 to about 10.

* * * * *